US012576699B2

(12) United States Patent　　　　(10) Patent No.:　US 12,576,699 B2
Farooq et al.　　　　　　　　　　(45) Date of Patent:　　Mar. 17, 2026

(54) CABLE DEPLOYABLE ACROSS VEHICLE DOOR OPENING

(71) Applicant: Ford Global Technologies, LLC, Dearborn, MI (US)

(72) Inventors: S.M. Iskander Farooq, Novi, MI (US); Mohammad Omar Faruque, Ann Arbor, MI (US); Dean D. Jaradi, Macomb, MI (US); Saeed D. Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 474 days.

(21) Appl. No.: 18/322,936

(22) Filed: May 24, 2023

(65) Prior Publication Data

US 2024/0391531 A1　　　Nov. 28, 2024

(51) Int. Cl.
　　*B60J 5/04*　　　　(2006.01)
　　*B62D 21/15*　　　(2006.01)
　　*B62D 25/04*　　　(2006.01)

(52) U.S. Cl.
　　CPC ........... *B60J 5/0479* (2013.01); *B60J 5/0422* (2013.01); *B60J 5/0429* (2013.01); *B60J 5/044* (2013.01); *B62D 21/157* (2013.01); *B62D 25/04* (2013.01); *B60J 2005/0475* (2013.01)

(58) Field of Classification Search
　　CPC ... B60J 5/0479; B60J 5/06; B60J 5/042; B60J 5/0422; B60J 5/0423; B60J 5/0429; B60J 5/0437; B60J 5/0438; B60J 5/044; B60J 5/0441; B60J 2005/0475; B62D 25/04; B62D 25/025; B62D 25/02; B62D 21/157

USPC ............ 296/187.12, 147, 150, 146.1, 146.6, 296/193.05, 193.06, 203.03
See application file for complete search history.

(56) References Cited

U.S. PATENT DOCUMENTS

| | | | | |
|---|---|---|---|---|
| 4,217,715 A | * | 8/1980 | Bryan, Jr. ............. | G09F 21/048 293/118 |
| 5,431,476 A | | 7/1995 | Torigaki | |
| 6,220,652 B1 | | 4/2001 | Browne et al. | |
| 6,893,079 B1 | * | 5/2005 | Johnson .................. | B60R 19/40 296/187.03 |
| 7,331,626 B2 | * | 2/2008 | Yoshimoto ........... | B62D 21/157 296/187.12 |

(Continued)

FOREIGN PATENT DOCUMENTS

| | | |
|---|---|---|
| DE | 19642686 C1 | 12/1997 |
| WO | 2020108859 A1 | 6/2020 |

*Primary Examiner* — Amy R Weisberg
*Assistant Examiner* — Denise Lynne Esquivel
(74) *Attorney, Agent, or Firm* — Frank A. MacKenzie; Brooks Kushman P.C.

(57)　　　　　　ABSTRACT

A vehicle includes a vehicle body including a front pillar and a rear pillar spaced along a vehicle-longitudinal axis. The front pillar and the rear pillar define a door opening therebetween. A first track is supported by the front pillar and a second track is supported by the rear pillar. A bar extends from the first track to the second track. The bar is moveable relative to the first track and the second track from a lowered position to a raised position. The bar extends across the door opening in the raised position. The vehicle includes a cable that includes a first end and a second end. The first end is fixed to the bar and moveable with the bar from the lowered position to the raised position. The second end is fixed to the vehicle body.

20 Claims, 11 Drawing Sheets

(56) References Cited

U.S. PATENT DOCUMENTS

| | | | | |
|---|---|---|---|---|
| 7,354,083 | B1 | 4/2008 | Obermann | |
| 7,472,922 | B2 | 1/2009 | Wu et al. | |
| 10,632,951 | B2 | 4/2020 | Nusier et al. | |
| 10,906,488 | B2 * | 2/2021 | Santiago | B60R 19/42 |
| 11,518,221 | B2 | 12/2022 | Jaradi et al. | |
| 11,554,647 | B1 * | 1/2023 | Faruque | B60J 5/0479 |
| 11,607,936 | B1 * | 3/2023 | Barbat | B60J 5/0486 |
| 12,077,122 | B1 * | 9/2024 | Jaradi | B62D 25/04 |
| 2009/0278363 | A1 | 11/2009 | Browne et al. | |

* cited by examiner

CABLE DEPLOYABLE ACROSS VEHICLE DOOR OPENING

BACKGROUND

A vehicle may include amenities that allow occupant ingress and egress of the vehicle. For example, a vehicle may not include a vertical, body-mounted pillar between the front pillar and rear pillar of a door opening to allow more space for occupants to ingress and egress the vehicle. Specifically, such vehicles may include two doors that meet at the location traditionally occupied by the vertical, body-mounted pillar when in a closed position. The door may be rotatable about the front pillar and the rear pillar, respectively, such that the doors rotate away from each other to an open position.

DETAILED DESCRIPTION

Figure 1:
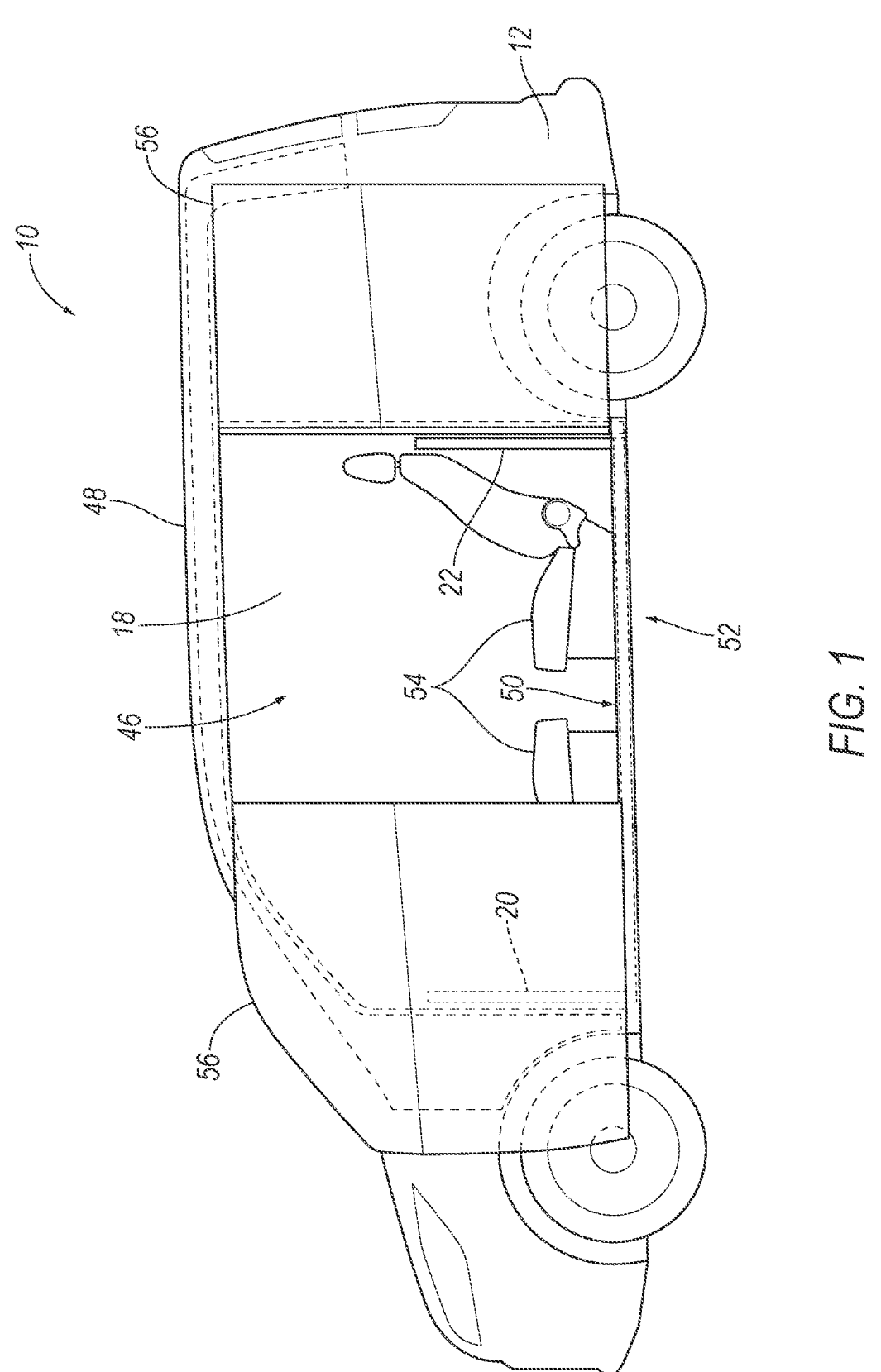
FIG. 1 is a side view of the vehicle including a bar and a cable in a lowered position with doors of the vehicle in an open position.

A vehicle includes a vehicle body including a front pillar and a rear pillar spaced along a vehicle-longitudinal axis. The front pillar and the rear pillar define a door opening therebetween. A first track is supported by the front pillar and a second track is supported by the rear pillar. A bar extends from the first track to the second track and is moveable relative to the first track and the second track from a lowered position to a raised position. The bar extends across the door opening in the raised position. A cable includes a first end and a second end. The first end is fixed to the bar and is moveable with the bar from the lowered position to the raised position. The second end is fixed to the vehicle body.

The vehicle may include a spool connected to the vehicle body and the second end of the cable may be anchored to the spool. The cable may be wound around the spool when the bar is in the lowered position. The vehicle may include a spring biasing rotation of the spool about a rotational axis of the spool. The spool may be rotatable by the cable in an extending direction when the bar moves from the lowered position toward the raised position. The spring may bias the spool in a retracting direction opposite the extending direction.

The vehicle may include a cable retractor supported by the vehicle body and the second end of the cable may be connected to the cable retractor. The cable retractor may be spring-loaded to spool the cable on the cable retractor when the bar moves from the raised position to the lowered position. The vehicle may include a lower frame member fixed to the vehicle body and the spool may be connected to the lower frame member.

The vehicle may include a second cable moveable with the bar from the lowered position to the raised position. The second cable may include a first end and a second end. The first end of the second cable may be fixed to the bar and may be moveable with the bar from the lowered position to the raised position and the second end of the second cable being fixed to the vehicle body. The first end of the cable may be spaced from the first end of the second cable along the vehicle-longitudinal axis. The cable and second cable may extend across the door opening from the first track to the second track when the bar is in the raised position. The cable may be elongated transverse to the second cable when the bar is in the raised position. The vehicle may include a sliding clip connected to the cable and the second cable. The cable and the second cable may cross each other at an intersection and the sliding clip coupling the cable and the second cable at the intersection.

The vehicle may include a sill covering between the front pillar and the rear pillar. The bar and the cable may be below the sill covering when the bar is in the lowered position.

The vehicle may include a pyrotechnic actuator operatively connected to the bar to move the bar from the lowered position to the raised position. The vehicle may include a lock on the first track and the lock locks the bar relative to the first track in the raised position.

The vehicle may include a linear actuator operatively connected to the bar to move the bar along the first track between the lowered position and the raised position. The linear actuator may includes a lead screw threadedly engaged with the bar and a motor operatively engaged with the lead screw to rotate the lead screw.

The first track and the second track each may be elongated upright.

The bar and the cable may be vehicle-inboard of the door opening when the bar is in the raised position.

The vehicle may include a front door supported by the front pillar and a rear door supported by the rear pillar. The front door and the rear door each may be moveable from an open position to a closed position. The cable may be vehicle-inboard of the front door and the rear door when the bar is in the raised position and the doors are in the closed position.

With reference to the Figures, wherein like numerals indicate like parts throughout the several views, a vehicle 10 includes a vehicle body 12 including a front pillar 14 and a rear pillar 16 spaced along a vehicle-longitudinal axis. The front pillar 14 and the rear pillar 16 define a door opening 18 therebetween. A first track 20 is supported by the front pillar 14 and a second track 22 is supported by the rear pillar 16. A bar 24 extends from the first track 20 to the second track 22. The bar 24 is moveable relative to the first track 20 and the second track 22 from a lowered position to a raised position. The bar 24 extends across the door opening 18 in the raised position. The vehicle 10 includes a cable 26, 28 that includes a first end 30 and a second end 32. The first end 30 of the cable 26, 28 is fixed to the bar 24 and moveable with the bar 24 from the lowered position to the raised position. The second end 32 of the cable 26, 28 is fixed to the vehicle body 12.

When the bar 24 is in the raised position and in the event of certain vehicle impacts, the bar 24 extending across the door opening 18 manages deformation into the vehicle 10. Since the second end 32 of the cable 26, 28 is fixed to the vehicle body 12 and the first end 30 of the cable 26, 28 is fixed to the bar 24 and moveable with the bar 24, the bar 24 moves the cable 26, 28 across the door opening 18 as the cable 26, 28 moves from the lowered position to the raised position. When the bar 24 is in the raised position, bar 24 and the cable 26, 28 manage deformation into the vehicle 10. As an example, in examples in which the vehicle 10 does not have a middle pillar, the extension of the bar 24 and the cable 26, 28 across the door opening 18 in the raised position manages deformation into the vehicle 10 in the event of certain vehicle impacts.

The vehicle 10 includes a cable-deployment assembly 34 including a drive mechanism 36 that moves the bar 24 relative to the first track 20 and the second track 22. In one example, such as the example in FIGS. 4-6, the drive mechanism 36 includes a motor 38 and a lead screw 40 for moving the bar 24 between the raised position and the lowered position. In another example, such as the example shown in FIGS. 7-9, the drive mechanism 36 includes a pyrotechnic retractor 44 and a tether 44 for moving the bar 24 from the lowered position to the raised position.

With reference to FIG. 1, the vehicle 10 may be any suitable type of automobile, e.g., a passenger or commercial automobile such as a sedan, a coupe, a truck, a sport utility, a crossover, a van, a minivan, a taxi, a bus, etc.

With reference to FIG. 1, the vehicle 10 defines the vehicle-longitudinal axis L extending between a front end (not numbered) and a rear-end (not numbered) of the vehicle 10. The vehicle 10 defines a vehicle-lateral axis A extending cross-vehicle from one side to the other side of the vehicle 10. The vehicle 10 defines a vertical axis V. The vehicle-longitudinal axis L, the vehicle-lateral axis A, and the vertical axis V are perpendicular relative to each other.

The vehicle 10 includes a vehicle frame (not numbered) and a vehicle body 12. The vehicle frame and the vehicle body 12 may be of a unibody construction in which the vehicle frame is unitary with a vehicle body 12 (including frame rails, pillars 14, 16, roof rails, etc.). As another example, the vehicle body 12 and vehicle frame may have a body-on-frame construction (also referred to as a cab-on-frame construction) in which the vehicle body 12 and vehicle frame are separate components, i.e., are modular, and the vehicle body 12 is supported on and affixed to the vehicle frame. In other examples, the vehicle frame and vehicle body 12 may have any suitable construction. The vehicle frame and vehicle body 12 may be of any suitable material, for example, steel, aluminum, and/or fiber-reinforced plastic, etc.

The vehicle body 12 defines a passenger compartment 46 to house occupants of the vehicle 10. The passenger compartment 46 may extend across the vehicle 10, i.e., from one side to the other side of the vehicle 10. The passenger compartment 46 includes a front end and a rear end with the front end being in front of the rear end during forward movement of the vehicle 10.

With continued reference to FIG. 1, the vehicle body 12 includes a roof assembly including two roof rails and a vehicle roof 48. The roof rails are spaced from one another in a cross-vehicle direction. The roof rails each extend longitudinally along the vehicle body 12, i.e., along a vehicle-longitudinal axis L.

The vehicle roof 48 may define the upper boundary of the passenger compartment 46 and may extend from the front end of the passenger compartment 46 to the rear end of the passenger compartment 46. The vehicle roof 48 may extend from one roof rail to the other roof rail. The vehicle roof 48 may be irremovably fixed to the roof rails. In other words, the vehicle roof 48 is secured to the roof rails in such a way that removal requires destruction such as cutting, e.g., cutting material and/or welded joints, etc. As an example, the vehicle roof 48 may be attached to both roof rails, e.g., by welding, fasteners, etc.

With reference to FIGS. 1-4, the vehicle body 12 includes a vehicle floor 50 spaced downwardly from the vehicle roof 48. The vehicle floor 50 may define the lower boundary of the passenger compartment 46 and may extend from the front end of the passenger compartment 46 to the rear end of the passenger compartment 46. The vehicle floor 50 may include a floor panel and upholstery on the vehicle floor 50. The upholstery may be, for example, carpet, and may have a class-A surface facing the passenger compartment 46, i.e., a surface specifically manufactured to have a high quality, finished, aesthetic appearance free of blemishes. The vehicle floor 50 may include cross-beams (not shown) connected to the floor panel and to other components of the vehicle body 12.

The vehicle body 12 includes pillars 14, 16 spaced from each along the vehicle-longitudinal axis L. Specifically, the vehicle body 12 includes the front pillar 14 and the rear pillar 16 spaced vehicle-rearward from the front pillar 14 on each side of the vehicle body 12. The vehicle body 12 may include one front pillar 14 and one rear pillar 16 on both sides of the vehicle body 12. The pillars may extend from the vehicle roof 48 to the vehicle floor 50. The vehicle 10 may include other pillars, in addition to the front pillar 14 and the rear pillar 16.

With continued reference to FIGS. 1-4, the vehicle body 12 includes a sill 52 extending from the front pillar 14 to the rear pillar 16. Specifically, the vehicle body 12 may include two sills 52, one on each side of the vehicle body 12. The sills 52 are elongated along the vehicle-longitudinal axis L. The vehicle 10 may include two sills 52, i.e., one sill 52 on either side of the passenger compartment 46. The sills 52 are spaced from the roof rails below the roof rails. The sills 52 are below the passenger compartment 46.

The vehicle body 12 defines the door opening 18 between front pillar 14 and the rear pillar 16 of the vehicle body 12. The door opening 18 may be between the front pillar 14 and the rear pillar 16 and between the sill 52 and the roof rail. In other words, the pillars are spaced from each other by the door opening 18 and the roof rail and sill 52 are spaced from each other by the door opening 18. The door opening 18 extends uninterrupted from the front pillar 14 to the rear pillar 16. The door opening 18 extends uninterrupted from the sill 52 to the vehicle roof 48. The door opening 18 allows for ingress and egress into the passenger compartment 46. The vehicle 10 may include any suitable number of door openings 18 to allow for ingress and egress into the passenger compartment 46. For example, as shown in the Figures, the vehicle 10 may include a door opening 18 on each side of the vehicle 10. In other examples, the vehicle 10 may include multiple door openings 18 on each side of the vehicle 10.

With reference to the example shown in the Figures, the vehicle body 12 may not include a middle pillar between the front pillar 14 and the rear pillar 16, i.e., the vehicle body 12 may not include a middle pillar between the front pillar 14 and the rear pillar 16 from the vehicle floor 50 to the vehicle roof 48. The vehicle body 12 lacking a middle pillar allows for the door opening 18 to extend from the front pillar 14 to the rear pillar 16. The door opening 18 extending from the front pillar 14 to the rear pillar 16 allows occupants easier access to the passenger compartment 46 for ingress and egress.

The vehicle 10 includes one or more seats. Specifically, the vehicle 10 may include any suitable number of seats 54. The seats 54 are supported by the vehicle floor 50. The seats 54 may be arranged in any suitable arrangement in the passenger compartment 46. In the example shown in the Figures in which the vehicle body 12 does not include a middle pillar, two seats 54 are adjacent the door opening 18 so that occupants of both seats 54 may enter and exit the passenger compartment 46 through the same door opening 18. The seat 54 may be of any suitable type, e.g., a bucket seat, bench seat, etc.

Figure 2:
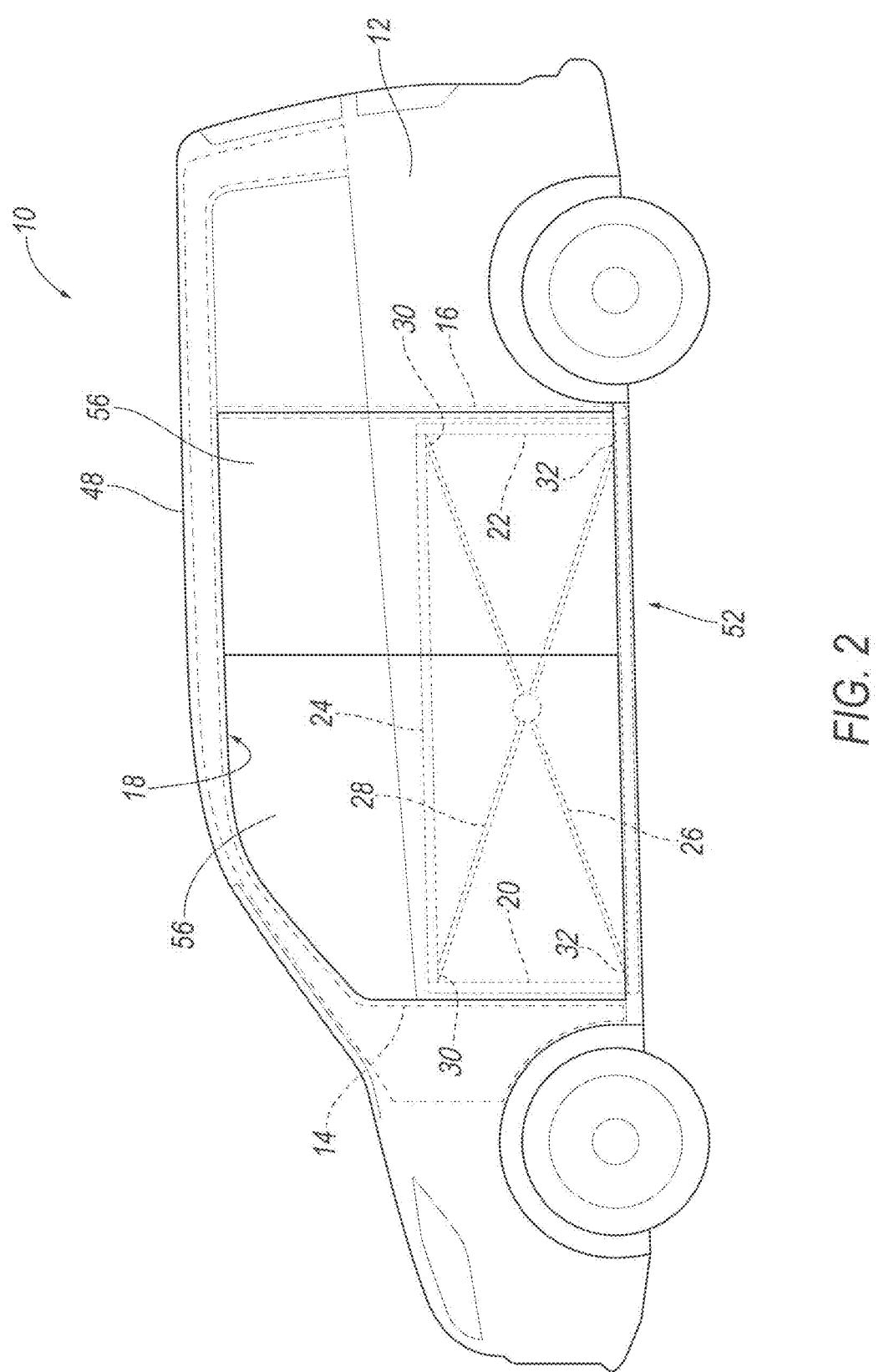
FIG. 2 is a side view of the vehicle with the doors in a closed position and the bar and the cable in a raised position.
Figure 3:
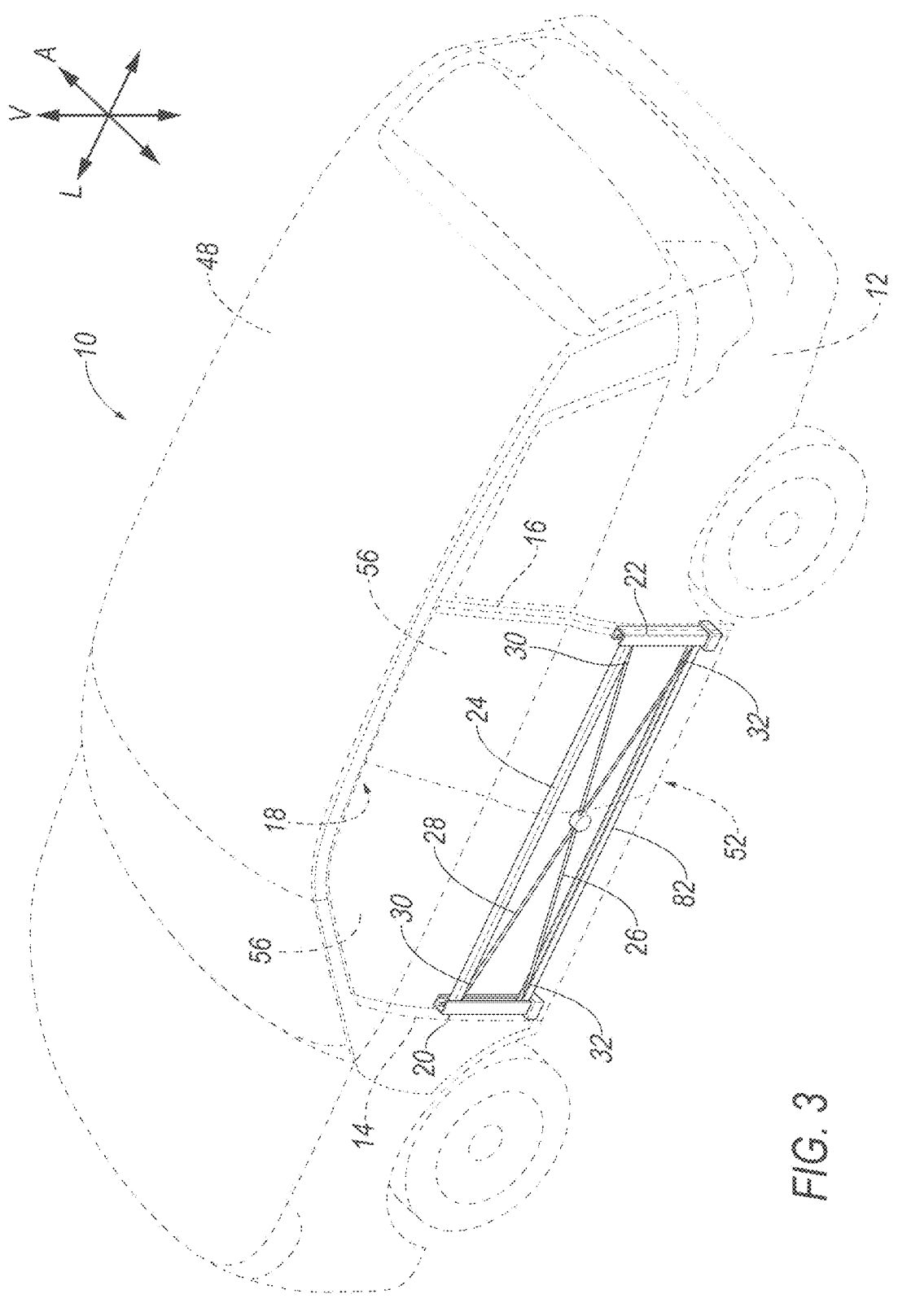
FIG. 3 is a perspective view of the vehicle with some components shown in broken lines to show the bar and the cable in the raised position.

With continued reference to FIGS. 1-3, the vehicle 10 includes a plurality of doors 56, movable from a closed position to an open position for vehicle 10 occupants to enter and exit the passenger compartment 46. The front door 56 may be supported by the front pillar 14 and the rear door 56 may be supported by the rear pillar 16 in the door opening 18. In the closed position, the doors 56 are in at least one of the door openings 18 in the vehicle body 12. In the example shown in FIGS. 1-3, the first door 56 and the second door 56 are both in the door opening 18 of the vehicle body 12, i.e., are in the same door opening 18. The doors 56 are vehicle-outboard from each of the seats 54.

In some examples, such as the example shown in FIGS. 1-2, the doors 56 may be slidably supported by the vehicle body 12. For example, the vehicle body 12 may include a track with the doors 56 being slidably supported by the track 20, 22. Each of the doors 56 is movable, i.e., slidable, from the closed position to the open position. In the closed position, the doors 56 on each side of the vehicle 10, i.e., the front door 56 and the rear door 56, are adjacent each other. As the doors 56 move to the open position, the front door 56 moves away from the rear door 56 toward the front end of the passenger compartment 46 and the rear door 56 moves away from the front door 56 toward the rear end of the passenger compartment 46. In other examples, a single door 56 may be slidably supported by the vehicle body 12 to cover the door opening 18 in the closed position. In other examples, one or more doors 56 may be rotatably mounted to the vehicle body 12 to rotate between the closed position and the open position.

The roof assembly contact a top edge (not numbered) of the doors 56 when the doors 56 are in the closed position. Each door 56 may include at least one door panel (not numbered) and a door-trim panel (not shown) supported on the door panel. Specifically, the door panel may include two panels, namely a door inner (not shown) and a door outer (not numbered). In such an example, the door-trim panel and the door outer are fixed to the door inner. The door-trim panel is positioned opposite the door outer relative to a door frame. The door-trim panel is inboard relative to the door inner, and the door outer is outboard relative to the door inner. The door 56 includes a window door opening (not numbered) that may be completely closed by a window (not numbered) when the window is in a fully raised position. The window door opening is defined by the door-trim panel and door outer on a bottom edge and either by the door inner circumscribing the window door opening or by the vehicle body 12. The door outer faces outboard relative to the vehicle 10. When the bar 24 is in the raised position, the bar 24 and the cable 26, 28 are inboard of the door 56, and more specifically inboard of the door-trim panel.

The door 56 outer may define a portion of the exterior of the vehicle 10. For example, the door 56 outer may present a class-A surface, i.e., a surface specifically manufactured to have a high-quality, finished aesthetic appearance free of blemishes. The door 56 outer may be metal (such as steel, aluminum, etc.) or polymeric (such as fiber reinforced plastic composite, etc.).

The door inner may be metal (such as steel, aluminum, etc.) or polymeric (such as fiber reinforced plastic composite, etc.). The door inner provides structural rigidity for the door outer. The door inner may provide a mounting location for components of the door 56.

As set forth above, the vehicle body 12 may include the sill 52 and the sill 52 may extend from the front pillar 14 to the rear pillar 16. Specifically, the vehicle body 12 may include two sills 52, one on each side of the vehicle body 12. The sills 52 are elongated along the vehicle-longitudinal axis L. The sills 52 may be adjacent the floor. The roof, sills 52, floor, and pillars may be irremovably fixed to each other, i.e., unable to be removed without cutting or other destruction of the roof, sills 52, floor, and pillars. In some examples, the pillars may be unitary with the sills 52 and/or the roof, i.e., a single, uniform piece of material with no seams, joints, fasteners, or adhesives connecting the pillars to the sills 52 and/or the roof. In such an example, the pillars and sills 52 and/or roof may be formed together simultaneously as a single continuous unit, e.g., by stamping, molding, etc. In other examples, in the alternative to being unitary, the pillars may be formed separately from the sills 52 and/or roof and subsequently connected to the sills 52 and/or roof, e.g., by welding.

With reference to FIGS. 5-6 and 8-9, the vehicle body 12 may include a sill covering 58. The bar 24 and the cable 26, 28 may be below the sill covering 58 when the bar 24 is in the lowered position. As set forth further below, the bar 24 may deploy from and/or through the sill covering 58 from the lowered position to the raised position. In some examples, the bar 24 and cable may extend from the sill covering 58 through a moveable covering, e.g., a flap, polymeric horsehair, etc., and in other examples, the bar 24 and cable may extend through a tear seam in the sill covering 58, by dislodging the sill covering 58 from the sill 52, etc.

The sill covering 58 may be between the front pillar 14 and the rear pillar 16 and, specifically, may extend from the front pillar 14 to the rear pillar 16. The sill covering 58 and/or the sill 52 defines the lower-most boundary of the door opening 18. The sill covering 58 faces upwardly and has a class-A surface, i.e., a finished surface exposed to view when doors 56 are open and free of unaesthetic blemishes and defects. The sill covering 58 may be separate from the sill 52 and disposed above the sill 52. In such an example, the sill covering 58 may be fixed to the sill 52, e.g., with clips, fasteners, etc., and may be metal, plastic, fabric. As another example, the sill covering 58 may be unitary with the sill 52, i.e., may be an upper panel of the sill 52. With reference to FIGS. 5-6 and 8-9, the sill 52 may define a slot 60 elongated from the front pillar 14 to the rear pillar 16. The slot 60 may be sized and shaped to receive the bar 24 and the cable 26, 28 when the bar 24 is in the lowered positions. The slot 60 allows the bar 24 and the cable 26, 28 to be recessed relative to the sill 52 when the bar 24 is in the lowered position.

The vehicle 10 includes a cable-deployment assembly 34. In the example shown in the Figures, the cable-deployment assembly 34 includes the cable 26, 28, a cable retractor 62, the bar 24, and the first track 20 and second track 22. The cable 26, 28 is fixed to the bar 24 and moves with the bar 24 between the lowered position and the raised position. The bar 24 is raised and lowered along the first track 20 and the second track 22 to move the cable 26, 28 from the unde-ployed position (i.e., when the bar 24 is in the lowered position) to a deployed position (i.e., when the bar 24 is in the raised position). The vehicle 10 may include any suitable number of cable deployment assemblies 34. For example, the vehicle 10 may include one cable-deployment assembly 34 on each side of the passenger compartment 46. Each of the cable 26, 28 deployment assemblies on each side of the vehicle 10 may be identical to each other except being supported by opposite sides of the vehicle 10.

The cable-deployment assembly 34 may include more than one cable. In the examples shown in the Figures, the cable-deployment assembly 34 includes two cables 26, 28. Common numerals are used to identify common features among the two cables 26, 28. As set forth above, the cable-deployment assembly 34 includes a drive mechanism 36 that moves the bar 24 relative to the first track 20 and the second track 22. In one example, such as the example in FIGS. 4-6, the drive mechanism 36 includes the motor 38 and the lead screw 40 for moving the bar 24 between the raised position and the lowered position. In another example, such as the example shown in FIGS. 7-9, the drive mechanism 36 includes the pyrotechnic retractor 44 and the tether 44 for moving the bar 24 from the lowered position to the raised position.

The bar 24 extends from the first track 20 to the second track 22. The bar 24 is moveable relative to the first track 20 and the second track 22 from the lowered position (FIG. 2) to a raised position (FIG. 3). The bar 24 extends across the door opening 18 in the raised position. The cable 26, 28 is supported by the bar 24. The cable 26, 28 extends across the door opening 18 when the bar 24 is in the raised position.

In the raised position and in the event of certain impacts to the vehicle 10, the bar 24 extends across the door opening 18 manages deformation into the vehicle 10. As an example, in examples in which the vehicle 10 does not have a middle pillar, the extension of the bar 24 across the door opening 18 in the raised position manages deformation into the vehicle 10. In such an example, the bar 24 and the cables 26, 28 may provide reinforcement to the side of the vehicle 10 by managing deformation into the vehicle 10 in the event of certain impacts.

As set forth further above, the cables 26, 28 are supported by the bar 24 and move with the bar 24 as the bar 24 moves relative to the door opening 18. In the example in the Figures, the assembly includes one bar 24. In other examples, the cable-deployment assembly 34 may include more than one bar 24 each raisable to different vertical positions in the raised position.

With continued reference to FIGS. 5-6 and 8-9, the bar 24 in the raised position is in the passenger compartment 46. Specifically, in the raised position, the bar 24 may be exposed to the passenger compartment 46.

The bar 24 is elongated along an axis of the bar 24. The bar 24 extends from the front pillar 14 to the rear pillar 16 in the raised position and the lowered position. Specifically, the bar 24 extends from a first end supported by the front pillar 14 to a second end supported by the rear pillar 16. The bar 24 extend from one side of the door opening 18 to the other side of the door opening 18. In other words, the bar 24 is elongated completely across the door opening 18 in the raised position. Specifically, the bar 24 extends continu-ously, i.e., unbroken, from the front pillar 14 to the rear pillar 16 in both the lowered position and the raised position. The bar 24 and the second bar 24 are vehicle-inboard of the door opening 18.

The bar 24 may be elongated along the sill 52 in the raised position and the lowered position. Specifically, the bar 24 is elongated from the front pillar 14 to the rear pillar 16 along the sill 52 when the bar 24 is in the lowered position and the raised position. The bar 24 may be vehicle-inboard of the sill 52. Specifically, the bar 24 may be on a vehicle-inboard side of the sill 52 both in the lowered position and the raised position.

With reference to FIGS. 1-3, the cable-deployment assembly 34 includes the first track 20 supported by the front pillar 14 and the second track 22 supported by the rear pillar 16. Specifically, the first track 20 is supported by the front pillar 14 and the second track 22 is supported by the rear pillar 16. The tracks 20, 22 may extend upwardly from the vehicle floor 50 toward the vehicle roof 48. Specifically, the first track 20 and the second track 22 are each elongated generally vertically along the front pillar 14 and the rear pillar 16. The adverb "generally" means that the first track 20 and/or the second track 22 may deviate from vertical due to manufacturing or architecture of the vehicle body 12. In the example shown in the Figures, the first track 20 and the second track 22 may include a "C" shaped cross-section, but in other examples the tracks 20, 22 may be of any suitable cross-section.

The first track 20 and/or the second track 22 may be exposed to the passenger compartment 46. In other words, the vehicle 10 does not include trim panels that cover the first track 20 and/or the second track 22. The first track 20 and/or the second track 22 may include rubber covers, horsehair, etc., over the tracks 20, 22 to conceal any mecha-nism inside the first track 20 and/or the second track 22. The cable-deployment assembly 34 may include a lower frame member 82 extending from the first track 20 to the second track 22. In such an example, the lower frame member 82 is fixed to the vehicle body 12, i.e., moves with the vehicle body 12 as a unit.

Figure 5:
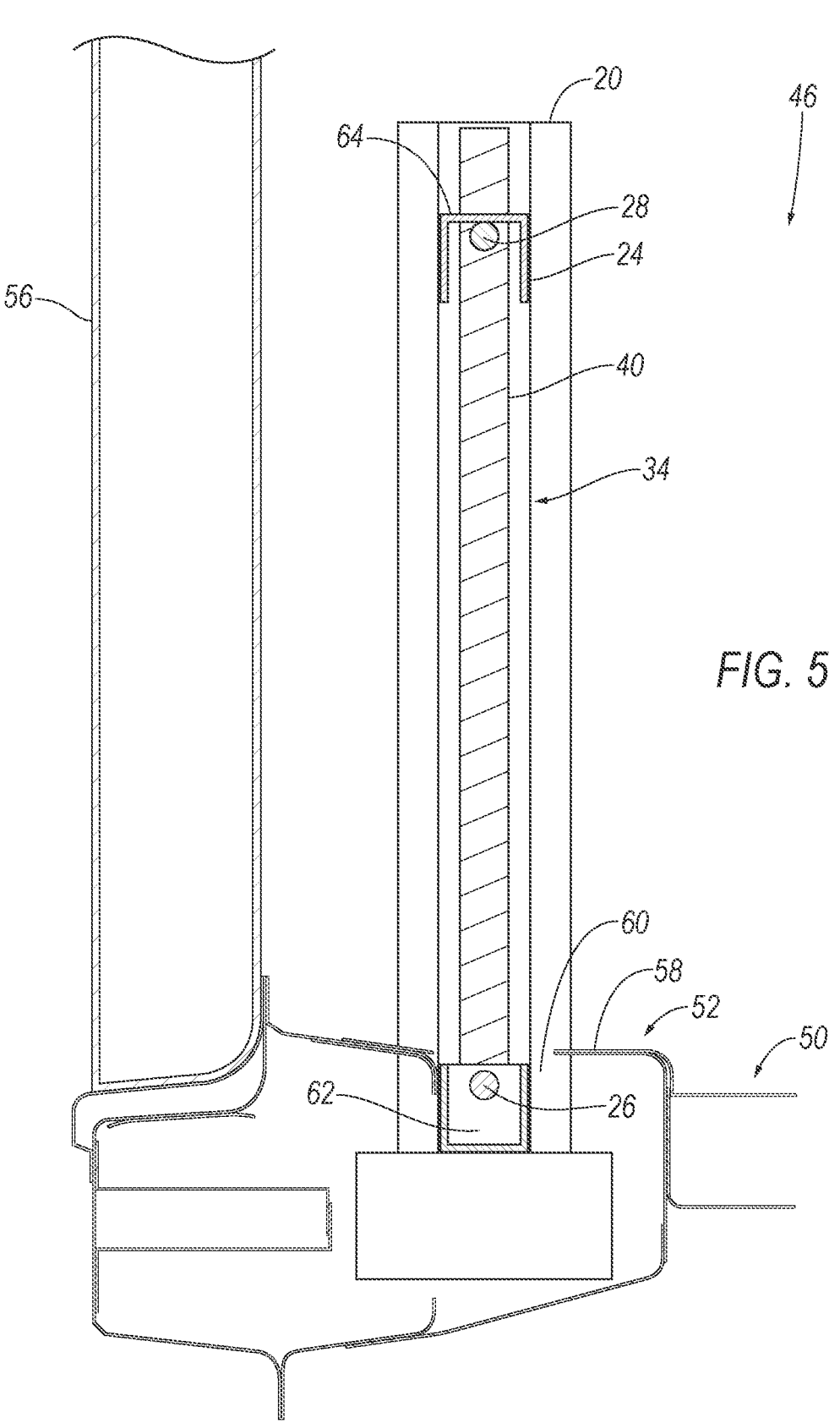
FIG. 5 is a cross-sectional view of the vehicle through one of the doors and a sill with the example assembly of FIG. 4.

With reference to FIG. 5 the cable-deployment assembly 34 may include one or more drive mechanisms 36. The drive mechanism 36 is fixed the first track 20 or the second track 22. Specifically, in some examples, the cable-deployment assembly 34 includes one drive mechanism 36 on the first track 20 and one drive mechanism 36 on the second track 22. In such examples, the drive mechanisms 36 work in con-junction with each other to move the bar 24 relative to the first track 20 and the second track 22.

The drive mechanism 36 is drivably coupled to the bar 24 to move the bar 24 along the first track 20 and the second track 22. In one example, such as the example in FIGS. 4-6, the drive mechanism 36 includes the motor 38 and the lead screw 40 for moving the bar 24 between the raised position and the lowered position. In another example, such as the example shown in FIGS. 7-9, the drive mechanism 36 includes the pyrotechnic retractor 44 and the tether 44 for moving the bar 24 from the lowered position to the raised position. In other examples, the drive mechanism 36 may include any suitable mechanism to move the bar 24s from the lowered position to the raised position.

Figure 4:
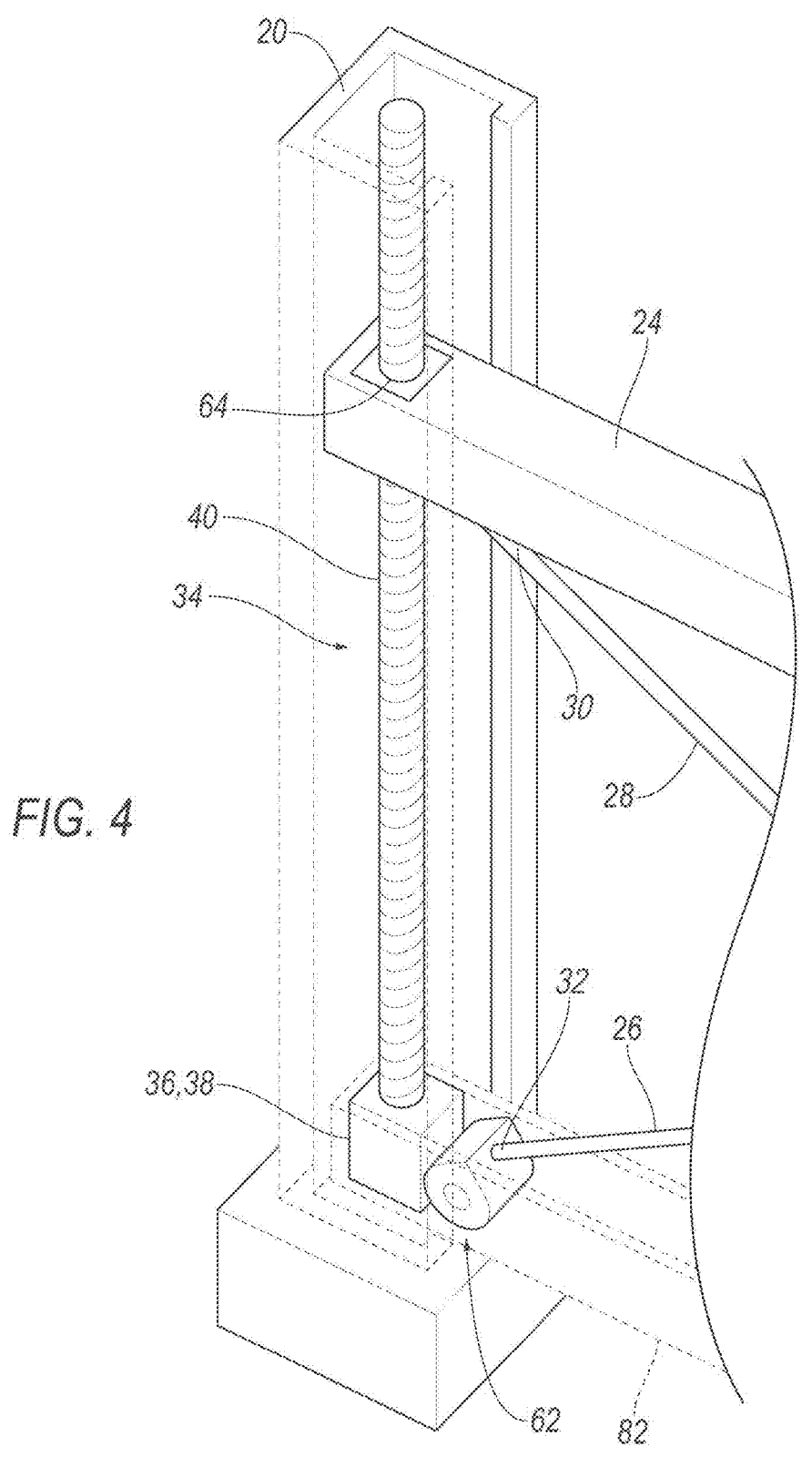
FIG. 4 is a perspective view of a portion of an example assembly including the bar and the cable with the bar moveable along a track by a lead screw and motor.
Figure 6:
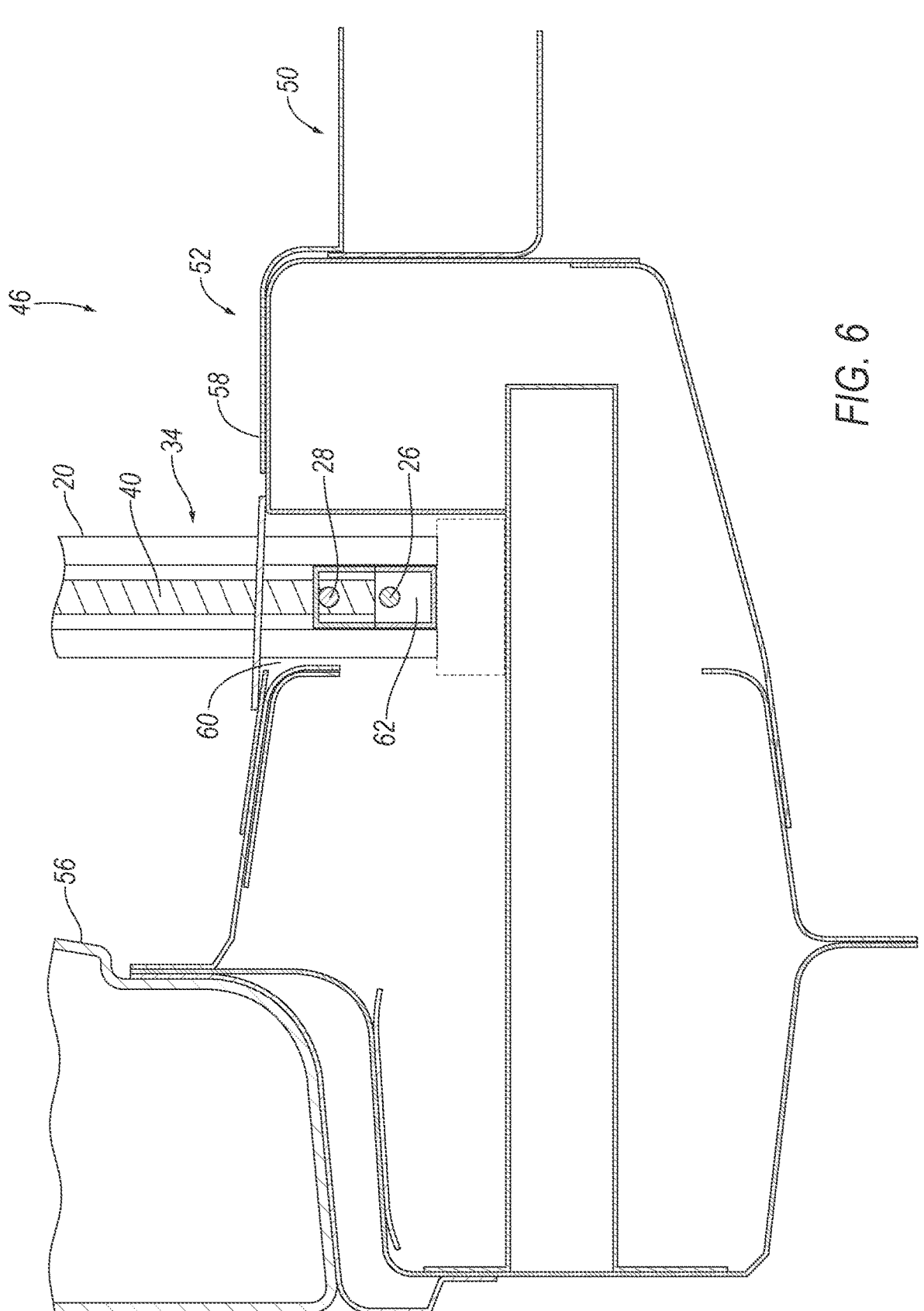
FIG. 6 is a magnified view of a portion of FIG. 5.

In the example shown in FIGS. 4-6, the drive mechanism 36 includes a linear actuator operatively connected to the bar 24 to move the bar 24 along the first track 20 between the lowered position and the raised position. For example, the linear actuator includes the lead screw 40 threadedly engaged with the bar 24 and the motor 38 operatively engaged with the lead screw 40 to rotate the lead screw 40. In such an example, the bar 24 may be moved into the raised position when the vehicle 10 is in motion and lowered when the vehicle 10 is stopped. Specifically, the bar 24 may be moved between the raised position and lowered for occupant ingress and egress. The bar 24 is in the raised position when the doors 56 are in the closed position, e.g., when the vehicle 10 is in motion, and the bar 24 is in the lowered position when the doors 56 are in the open position, e.g., when the vehicle 10 is no longer in motion. When the doors 56 are in the closed position and the bar 24 is in the raised position, the bar 24 is adjacent the doors 56. Specifically, when the doors 56 are in the closed position and the bar 24s are in the raised position, the bar 24 is vehicle-inboard of the doors 56. When the doors 56 are in the open position, the bar 24 is below the doors 56 and in the lowered position.

The drive mechanism 36 in FIGS. 4-6 may include the lead screw 40 extending along the track 20, 22, i.e., from a bottom of the track 20, 22 to a top of the tracks 20, 22. The bar 24 includes a threaded hole 64 at each of the end of the bar 24 that allows the bar 24 to move along the lead screw 40 to a predetermined height. As set forth above, one drive mechanism 36 may be on the first track 20 and another drive mechanism 36 may be on the second track 22, and in such examples, the bar 24 includes one threaded hole 64 at each end of the bar 24. The threaded hole 64 and the respective lead screw 40 are both threaded with corresponding threads engaged with each other such that, when the lead screw 40 is turned, the threaded engagement between the lead screw 40 and the bar 24 drives the bar 24 linearly along the lead screw 40.

In the drive mechanism 36 in the example shown in FIGS. 4-6, the motor 38 may be an electric motor of any suitable type. The motor 38 may be fixed to each of the tracks 20, 22, e.g., for driving the lead screw 40. The electric motor 38 may rotate the lead screw 40 to move the bar 24 between the lowered position and the raised position. The threading of the lead screw 40 and the threaded hole 64 may be tuned to adjust the rate at which the bar 24 moves along the tracks 20, 22. The drive mechanism 36 may be in communication with a sensor (not shown) identifying the location of the bar 24s along the tracks 20, 22.

Figure 7:
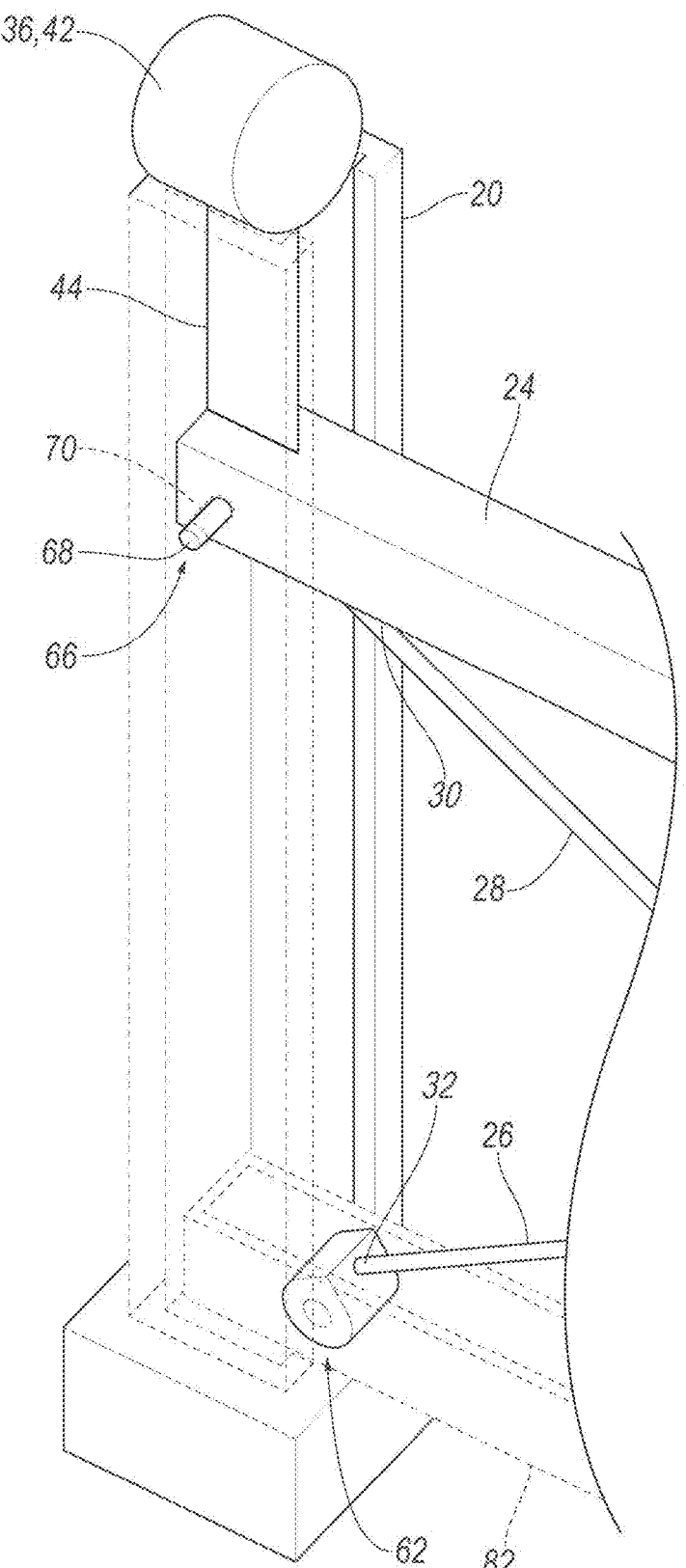
FIG. 7 is a perspective view of a portion of another example assembly including the bar and the cable with the bar movable along a track by a pyrotechnic actuator.
Figure 8:
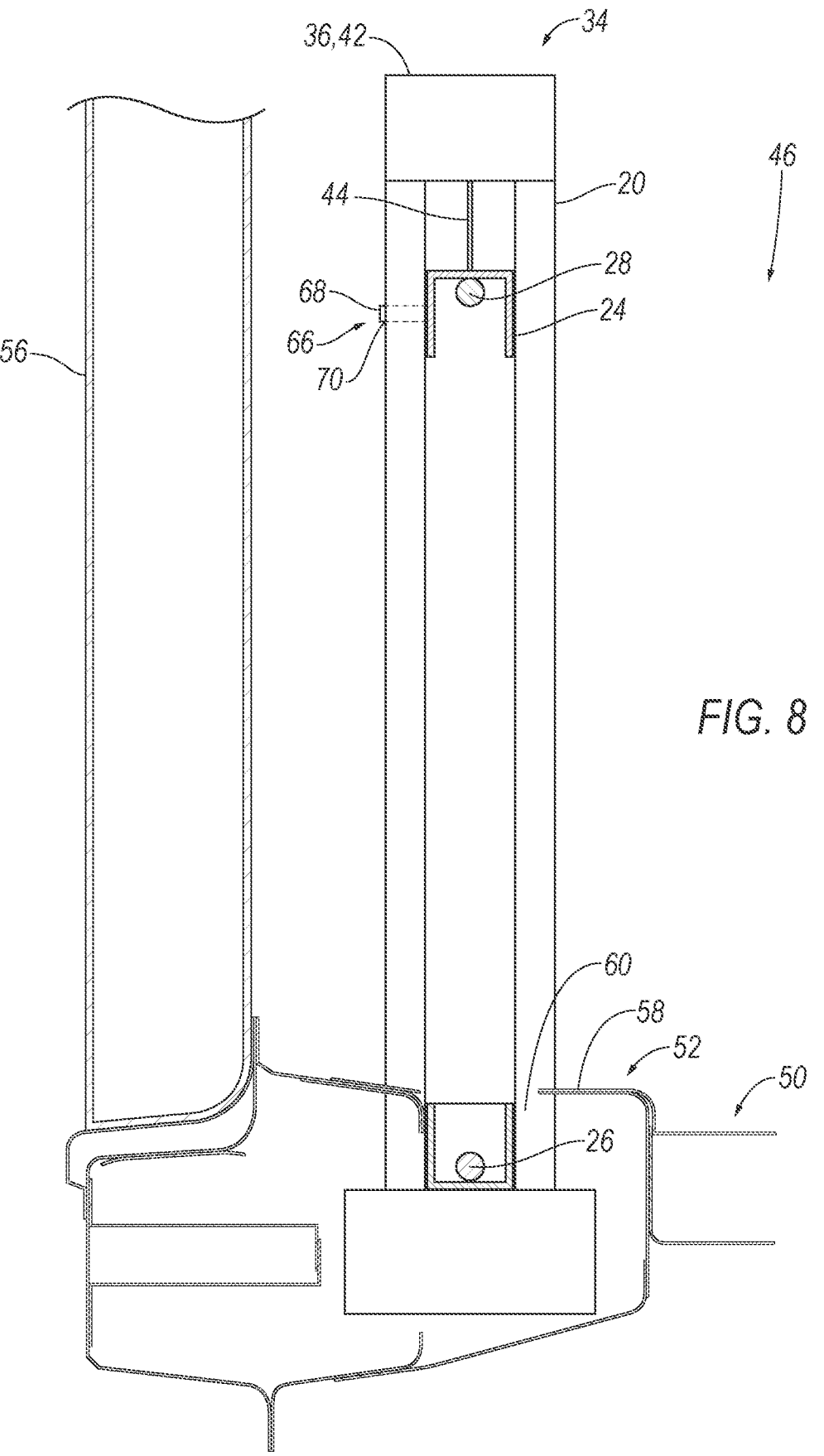
FIG. 8 is a cross-sectional view of the vehicle through one of the doors and the sill with the example assembly of FIG. 7.
Figure 9:
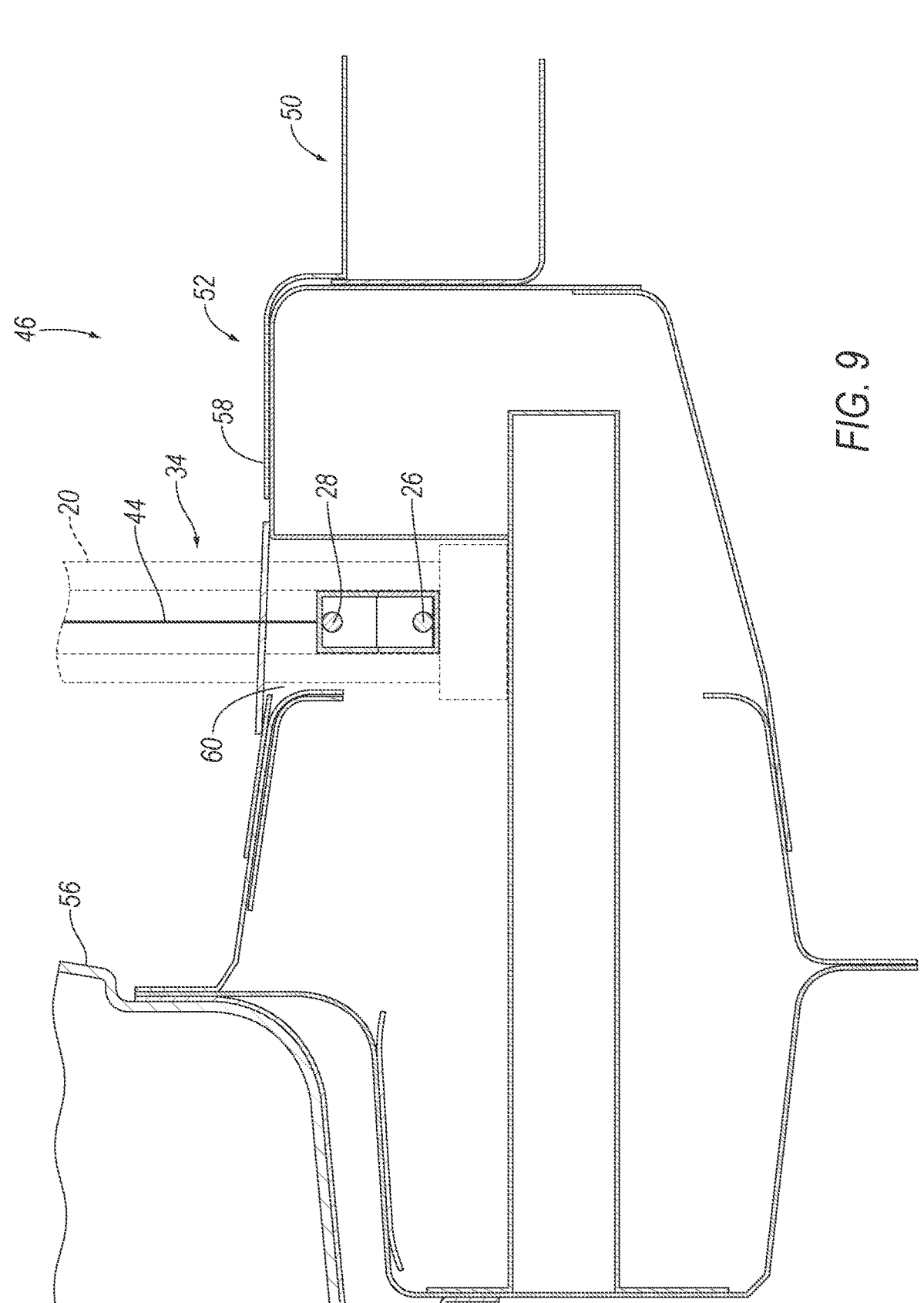
FIG. 9 is a magnified view of a portion of FIG. 8.

In the example shown in FIGS. 7-9, the cable-deployment assembly 34 is pyrotechnically activated for single use. In other words, during operation of the vehicle 10 absent certain vehicle impacts, the bar 24 is in the lowered position and, in event of certain vehicle impact is detected, the cable-deployment assembly 34 moves the bar 24 to the raised position.

As set forth above, the cable-deployment assembly 34 of FIGS. 7-9 includes at least one pyrotechnic retractor 44. The pyrotechnic retractor 44 is operatively connected to the bar 24 to move the bar 24 from the lowered position to the raised position. In the event of certain vehicle impacts, the pyrotechnic retractor 44 pulls the bar 24 upwardly. Specifically, a tether 44 extends from the bar 24 to the pyrotechnic retractor 44 and the pyrotechnic retractor 44 is designed to retract the tether 44 to move the tether 44 from the lowered position to the raised position.

The pyrotechnic retractor 44 is fixed to one of the pillars. The cable-deployment assembly 34 may include more than one pyrotechnic retractor 44. For example, the cable-deployment assembly 34 may include one pyrotechnic retractor 44 fixed to the front pillar 14 and one pyrotechnic retractor 44 fixed to the rear pillar 16. The pyrotechnic retractor 44 may be fixed to the respective pillar 14, 16 in any suitable fashion, e.g., threaded fasteners, brackets, welding, etc.

The pyrotechnic retractor 44 is connected to the bar 24. Specifically, the pyrotechnic retractor 44 is operatively connected to the bar 24 to pull the bar 24 upwardly. Specifically, the tether 44 extends from the pyrotechnic retractor 44 to the bar 24 and the bar 24 is connected to the cable 26, 28. During deployment of the pyrotechnic retractor 44, the pyrotechnic retractor 44 retracts the tether 44, the tether 44 pulls the bar 24 upwardly, and the bar 24 pulls the cable 26, 28 upwardly.

The tether 44 may be disposed along the track 20, 22 between the track 20, 22 and a trim panel on the track 20, 22. In other words, the trim panel may conceal the tether 44 in the undeployed position. During inflation of the airbag and retraction of the tether 44, the tether 44 breaks the trim panel, e.g., by releasing the trim panel from the track 20, 22, splitting a tear seam on the trim panel, etc.

The cable-deployment assembly 34 in the example shown in FIGS. 7-9 may include a lock 66 that locks the bar 24 to the track 20, 22 in the deployed position. The lock 66 is at least, in part, on the first track 20 and locks the bar 24 relative to the first track 20 in the raised position. In the example shown in the Figures, the lock 66 includes a spring-loaded pin 68 on one of the bar 24 and the track 20, 22 and a hole 70 on the other of the bar 24 and the track 20, 22. In the example shown in the FIG. 7, the spring-loaded pin 68 is on the bar 24, i.e., with a spring retained in a cavity of the bar 24 and the hole 70 is on the track 20, 22. In that example, the spring-loaded pin 68 abuts the track 20, 22 and the track 20, 22 depresses the spring-loaded pin 68 into the cavity of the bar 24. The spring-loaded pin 68 rides along the track 20, 22 upwardly as the pyrotechnic retractor 44 pulls the bar 24 upwardly. When the spring-loaded pin 68 reaches the hole 70 in the track 20, 22, the spring biases the spring-loaded pin 68 into the hole 70 to prevent the bar 24 from moving relative to the track 20, 22.

The pyrotechnic retractor 44 is pyrotechnically activated to pull the bar 24 upwardly. In such an example, the pyrotechnic retractor 44 includes a housing (not numbered) and a pyrotechnic charge (not numbered) in the housing. The pyrotechnic charge is activated to retract the tether 44. The pyrotechnic retractor 44 may be, for example, a rotary retractor with a spool that rotates to wrap the tether 44. The pyrotechnic charge is combustible to produce a gas, e.g., to retract a piston or turn a wheel, to retract the tether 44 into the housing of the pyrotechnic retractor 44. The pyrotechnic charge may be a solid mixture of substances that, when ignited, retract to produce the gas. For example, the pyrotechnic charge may be formed of sodium azide ($NaNO_3$), potassium nitrate ($KNO_3$), and silicon dioxide ($SiO_2$), which react to form nitrogen gas ($N_2$).

Figure 10A:
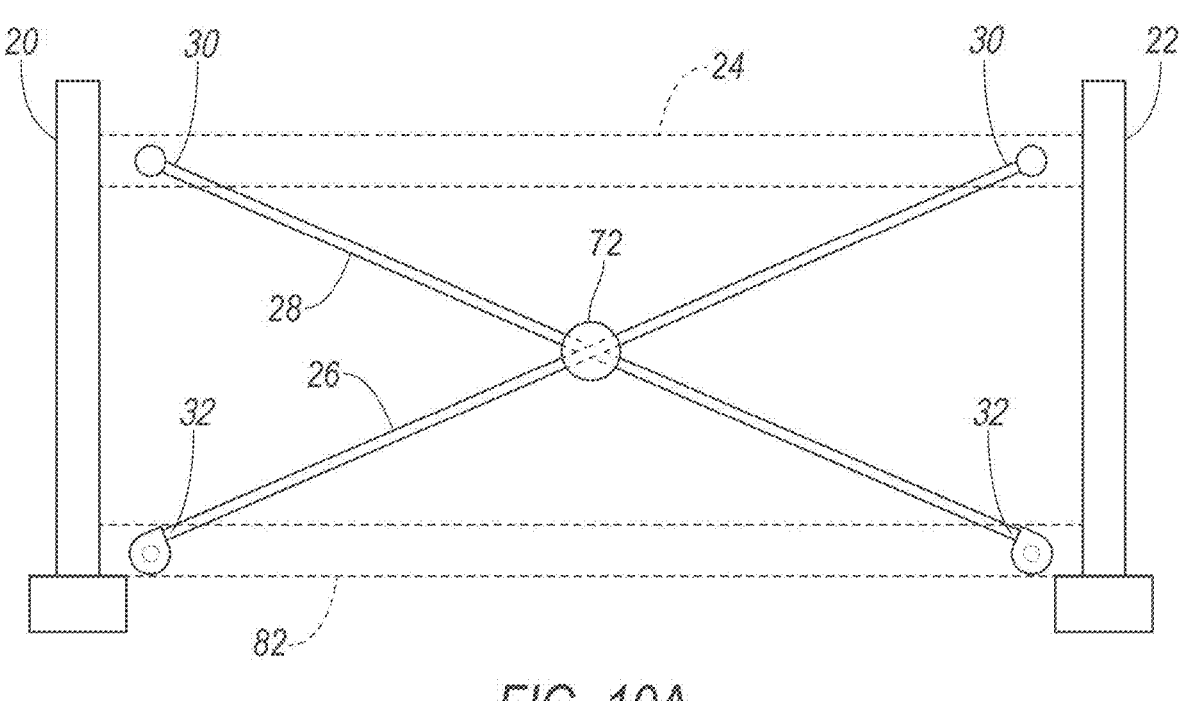
FIG. 10A is a side view of an example of the assembly in the raised position.
Figure 10B:
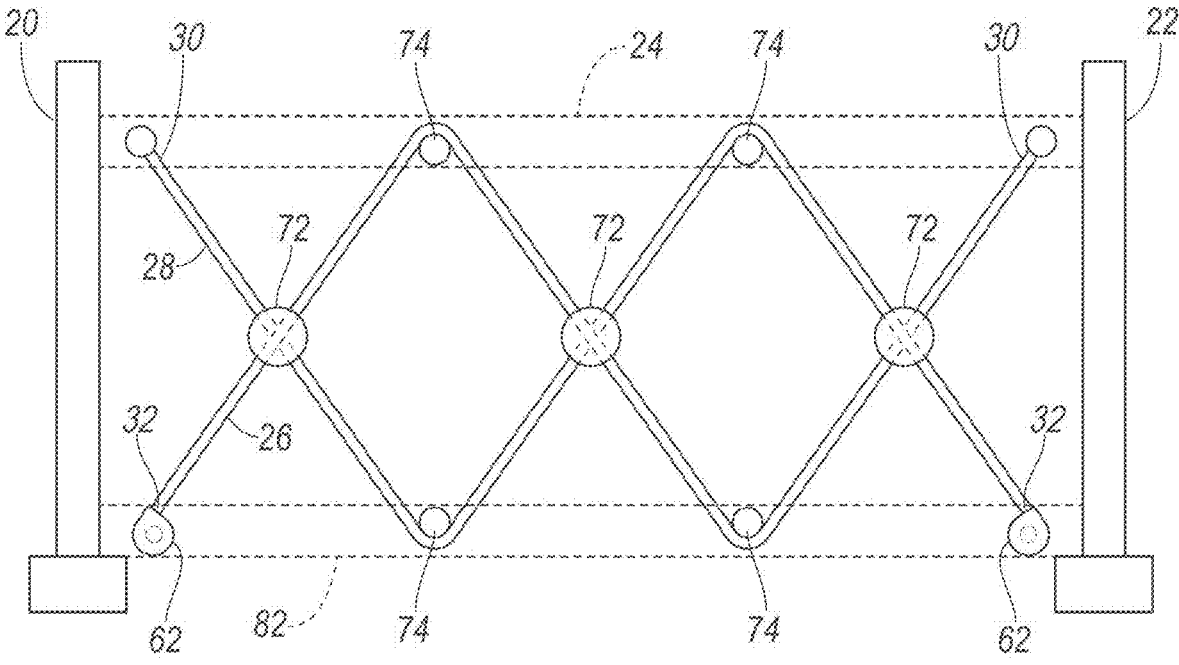
FIG. 10B is a side view of another example of the assembly in the raised position.

As set forth above, the cable-deployment assembly 34 may include one or more cables 26, 28. In the examples shown in the Figures, the cable-deployment assembly 34 includes two cables, namely a first cable 26 and a second cable 28. Each cable may be, for example, a braided metal cable, e.g., a braided steel cable. In other examples, the cable 26, 28 may be of any suitable material including metals, composites, combinations thereof, etc. One example configuration of the cables 26, 28 is shown in FIG. 10A and another example configuration of the cables 26, 28 is shown in FIG. 10B, as described further below.

Each cable includes a first end 30 and a second end 32. The first end 30 of each cable is fixed to the bar 24 and moves with the bar 24 from the lowered position to the raised position. The second end 32 is fixed to the vehicle body 12. The second end 32 may be fixed directly or indirectly to the vehicle body 12 and, in any event, the bar 24 moves relative to the second end 32 as the bar 24 moves from the lowered position to the raised position. In the example shown in the Figures, the second end 32 of the cable 26, 28 is connected to a base of the cable-deployment assembly 34 that is fixed to the vehicle body 12. The first end 30 may be fixed to the bar 24 and the second end 32 is fixed to the vehicle body 12 (or an intermediate component between the second end 32 and the vehicle body 12) in any suitable fashion, e.g., threaded connection, bracket, welding, etc.

In the examples including two cables, the cables 26, 28 are elongated transverse to each other when the bar 24 is in the raised position. For example, in the example shown in FIG. 10A, the first cable 26 extends upwardly from the first end 30 of the first cable 26 to the second end 32 of the first cable 26 in a vehicle-rearward direction, and the second cable 28 extends upwardly from the first end 30 of the second cable 28 to the second end 32 of the second cable 28. The first cable 26 crosses the second cable 28 transverse to the second cable 28 when the bar 24 is in the raised position. The second end 32 of the first cable 26 is above the first end 30 of the second cable 28 in the raised position, and the second end 32 of the second cable 28 is above the first end 30 of the first cable 26 in the raised position. The first end 30 of the first cable 26 is spaced from the first end 30 of the second cable 28 along the vehicle-longitudinal axis. Specifically, the first end 30 of the first cable 26 is vehicle-rearward of the first end 30 of the second cable 28 when the bar 24 is in the raised position. The second end 32 of the first cable 26 is spaced from the second end 32 of the second cable 28 along the vehicle-longitudinal axis. Specifically, the second end 32 of the first cable 26 is vehicle-forward of the second end 32 of the second cable 28 when the bar 24 is in the raised position.

The first cable 26 and second cable 28 extend across the door opening 18 from the first track 20 to the second track 22 when the bar 24 is in the raised position. The cables 26, 28 are vehicle-inboard of the door opening 18 when the bar 24 is in the raised position. Specifically, the cable 26, 28 is between the door opening 18 and the passenger compartment 46.

The cable 26, 28 may be in tension between the pillars in the deployed position. In the example shown in the Figures, the length of the cable 26, 28 and the spacing of the pillars 14, 16 are sized such that the cable 26, 28 is in tension between the pillars in the deployed position. The tension in the cable 26, 28 in the deployed position transmits forces from the cables 26, 28 to the pillars during certain vehicle impacts, e.g., a side impact. The tension in the cable 26, 28 allows for the cable 26, 28 to support the airbag when cable 26, 28 is in the deployed position and the airbag is in the inflated position.

The cable-deployment assembly 34 may include a sliding clip 72 connected to the first cable 26 and the second cable 28 to position the first cable 26 and the second cable 28 relative to each other in the deployed position. The first cable 26 and the second cable 28 cross each other at an intersection and the sliding clip 72 couples the cable 26, 28 and the second cable 28 at the intersection. The intersection is the point at which the first cable 26 and the second cable 28 cross when viewed cross vehicle. The sliding clip 72 may be of any type. As an example, the sliding clip 72 may include a through-hole that slidingly receives the first cable 26 and another through-hole that slidingly receives the second cable 28. In other examples, the sliding clip 72 may have any suitable configuration that maintains the cross-vehicle position of the first cable 26 and the second cable 28 relative to each other while allowing the first cable 26 and the second cable 28 to slide relative to each other as the bar 24 moves from the lowered position to the raised position. The first cable 26 and the second cable 28 slide relative to the sliding clip 72 as the bar 24 is raised from the lowered position to the raised position (and from the raised position to the lowered position, e.g., in the example in FIGS. 4-6). In the example shown in FIG. 10A, the cable-deployment assembly 34 includes one sliding clip 72. In the example shown in FIG. 10B, the cable-deployment assembly 34 includes three sliding clips 72.

In the example shown in FIG. 10A, the first cable 26 extends linearly from the first end 30 of the first cable 26 to the second end 32 of the first cable 26, and the second cable 28 extends linearly from the first end 30 of the second cable 28 to the second end 32 of the second cable 28. As another example, as shown in FIG. 10B, the first cable 26 and the second cable 28 each extend in a zig zag pattern from the respective first end 30 to the respective second end 32. In such an example, the cable-deployment assembly 34 may include posts 74 about which the cable 26, 28 wraps. Pulley wheels may be on the posts 74. The posts 74 may be fixed to the bar 24 and the vehicle body 12, e.g., indirectly through the lower frame member 82.

The cable-deployment assembly 34 may include a cable retractor 62 supported by the vehicle body 12 to allow the cable 26, 28 to retractably extend therefrom. In other words, the cable retractor 62 pays out the cable 26, 28 as the bar 24 moves from the lowered position to the raised position and retracts the cable 26, 28 as the bar 24 moves from the raised position to the lowered position. In the example shown in FIGS. 4-6 and 10A, the cable-deployment assembly 34 includes two cable retractor 62s, i.e., one for each cable.

The second end 32 of the cable 26, 28 is connected to the cable retractor 62 and the first end 30 is paid out of the cable retractor 62. The cable retractor 62 may be, for example, spring-loaded to spool the cable 26, 28 on the cable retractor 62 when the bar 24 moves from the raised position to the lowered position. For example, the cable retractor 62 may include a spool 76 connected to the vehicle body 12 and the second end 32 of the cable 26, 28 is anchored to the spool 76. The spool 76 may be spring-loaded, as described below. The cable retractor 62 may include a housing 78 fixed to the vehicle body 12 and the spool 76 is retained in and rotatable relative to the housing 78. The housing 78 may be indirectly fixed to the vehicle body 12, e.g., may be fixed directly to the lower frame member 82.

Figures 11A, 11B:
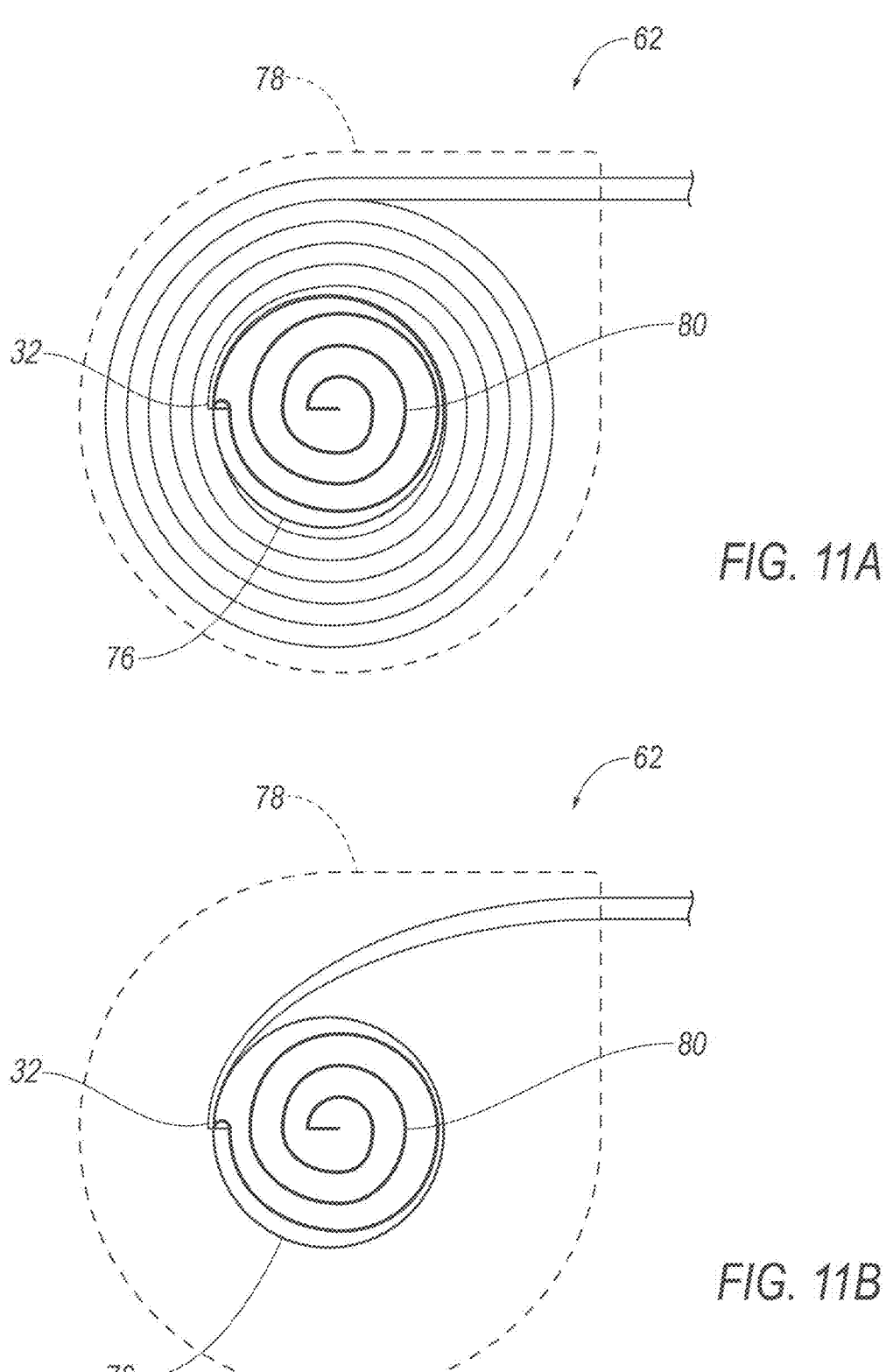
FIG. 11A is a side view of the cable retractor a housing in broken lines to show a cable wound around a spool when the bar and cable are in the lowered position.
FIG. 11B is the side view of FIG. 11A when the bar and cable are in the raised position.

The cable 26, 28 is wound around the spool 76 when the bar 24 is in the lowered position. A spring 80 is anchored to the housing 78 and to the spool 76 and biases rotation of the spool relative to the housing 78 about a rotational axis of the spool 76. The spring 80 may be, for example, a torsion spring. The spring 80 biases rotation of the spool 76 toward retraction of the cable 26, 28 into the housing 78. The spool 76 is rotatable by the cable 26, 28 in an extending direction when the bar 24 moves from the lowered position toward the raised position. When the bar 24 moves from the raised position toward the lowered position, the spring 80 biases the spool 76 in a retracting direction opposite the extending direction. FIG. 11A shows the cable retractor 62 when the bar 24 is in the lowered position with the cable 26, 28 wound around the spool 76. As shown in FIG. 11B, when the cable 26, 28 is entirely paid out from the housing 78, the spool 76 can rotate no more, thus creating a stop for the payout of the cable 26, 28. This stop may be used to design the cable-deployment assembly 34 with the cable 26, 28 in tension in the deployed position, as described above.

The disclosure has been described in an illustrative manner, and it is to be understood that the terminology which has been used is intended to be in the nature of words of description rather than of limitation. The numerical adjectives "first," "second," etc., are used herein merely as identifiers and do not indicate order or importance. Many modifications and variations of the present disclosure are possible in light of the above teachings, and the disclosure may be practiced otherwise than as specifically described.

What is claimed is:

1. A vehicle comprising:

a vehicle body including a front pillar and a rear pillar spaced along a vehicle-longitudinal axis, the front pillar and the rear pillar defining a door opening therebetween;

a first track supported by the front pillar and a second track supported by the rear pillar;

a bar extending from the first track to the second track and moveable relative to the first track and the second track from a lowered position to a raised position, the bar extending across the door opening in the raised position; and a cable including a first end and a second end, the first end being fixed to the bar and moveable with the bar from the lowered position to the raised position, the second end being fixed to the vehicle body.

2. The vehicle of claim 1, further comprising a spool connected to the vehicle body, the second end of the cable being anchored to the spool.

3. The vehicle of claim 2, wherein the cable is wound around the spool when the bar is in the lowered position.

4. The vehicle of claim 2, further comprising a spring biasing rotation of the spool about a rotational axis of the spool, the spool being rotatable by the cable in an extending direction when the bar moves from the lowered position toward the raised position, the spring biasing the spool in a retracting direction opposite the extending direction.

5. The vehicle of claim 1, further comprising a cable retractor supported by the vehicle body, the second end of the cable being connected to the cable retractor.

6. The vehicle of claim 5, wherein the cable retractor is spring-loaded to spool the cable on the cable retractor when the bar moves from the raised position to the lowered position.

7. The vehicle of claim 2, further comprising a lower frame member fixed to the vehicle body, the spool being connected to the lower frame member.

8. The vehicle of claim 1, further comprising a second cable moveable with the bar from the lowered position to the raised position, the second cable including a first end and a second end, the first end of the second cable fixed to the bar and moveable with the bar from the lowered position to the raised position and the second end of the second cable being fixed to the vehicle body.

9. The vehicle of claim 8, wherein the first end of the cable is spaced from the first end of the second cable along the vehicle-longitudinal axis, the cable and second cable extend across the door opening from the first track to the second track when the bar is in the raised position.

10. The vehicle of claim 8, wherein the cable is elongated transverse to the second cable when the bar is in the raised position.

11. The vehicle of claim 8, further comprising a sliding clip connected to the cable and the second cable, the cable and the second cable crossing each other at an intersection and the sliding clip coupling the cable and the second cable at the intersection.

12. The vehicle of claim 1, further comprising a sill covering between the front pillar and the rear pillar, the bar and the cable being below the sill covering when the bar is in the lowered position.

13. The vehicle of claim 1, further comprising a pyrotechnic actuator operatively connected to the bar to move the bar from the lowered position to the raised position.

14. The vehicle of claim 13, further comprising a lock on the first track, the lock locking the bar relative to the first track in the raised position.

15. The vehicle of claim 1, further comprising a linear actuator operatively connected to the bar to move the bar along the first track between the lowered position and the raised position.

16. The vehicle of claim 15, wherein the linear actuator includes a lead screw threadedly engaged with the bar and a motor operatively engaged with the lead screw to rotate the lead screw.

17. The vehicle of claim 1, wherein the first track and the second track are each elongated upright.

18. The vehicle of claim 1, wherein the bar and the cable are vehicle-inboard of the door opening when the bar is in the raised position.

19. The vehicle of claim 1, further comprising a front door supported by the front pillar and a rear door supported by the rear pillar, the front door and the rear door each being moveable from an open position to a closed position.

20. The vehicle of claim 19, wherein the cable is vehicle-inboard of the front door and the rear door when the bar is in the raised position and the doors are in the closed position.

\* \* \* \* \*